US010474664B2

(12) United States Patent
Bhargava et al.

(10) Patent No.: US 10,474,664 B2
(45) Date of Patent: Nov. 12, 2019

(54) LOCK MODE DETERMINATION SERVICE

(71) Applicant: SAP SE, Walldorf (DE)

(72) Inventors: Apoorv Bhargava, Bangalore (IN); Markus Schmidt-Karaca, Heidelberg (DE); Raghavendra Rao M G, Walldorf (DE); Naveed Mohammed B, Bangalore (IN); Aswin Kumar Jayaraman, Chennai (IN)

(73) Assignee: SAP SE, Walldorf (DE)

( * ) Notice: Subject to any disclaimer, the term of this patent is extended or adjusted under 35 U.S.C. 154(b) by 204 days.

(21) Appl. No.: 15/454,470

(22) Filed: Mar. 9, 2017

(65) Prior Publication Data
US 2018/0260429 A1 Sep. 13, 2018

(51) Int. Cl.
*G06F 16/30* (2019.01)
*G06F 16/23* (2019.01)
*G06F 9/52* (2006.01)

(52) U.S. Cl.
CPC .......... *G06F 16/2343* (2019.01); *G06F 9/526* (2013.01)

(58) Field of Classification Search
CPC .................................................. G06F 17/30362
USPC .......................................................... 707/704
See application file for complete search history.

(56) References Cited

U.S. PATENT DOCUMENTS

| | | | | |
|---|---|---|---|---|
| 5,721,943 A | * | 2/1998 | Johnson ..................... | G06F 9/52 707/999.008 |
| 6,144,983 A | * | 11/2000 | Klots ......................... | G06F 9/52 707/999.008 |
| 6,418,438 B1 | * | 7/2002 | Campbell ................ | G06F 9/466 |
| 6,772,155 B1 | * | 8/2004 | Stegelmann ...... | G06F 17/30362 |
| 6,826,570 B1 | * | 11/2004 | Eshel ................. | G06F 17/30171 |
| 7,206,794 B2 | * | 4/2007 | Rapp ................. | G06F 17/30362 707/704 |

(Continued)

FOREIGN PATENT DOCUMENTS

| | | |
|---|---|---|
| EP | 1906308 A1 | 4/2008 |
| WO | WO 2006/113434 A2 | 10/2006 |

OTHER PUBLICATIONS

SAP, "Real Time Analysis, Awareness, and Prediction Solutions," https://www.sap.com/solution/industry/public-sector/real-time-situational-awareness.html, 4 pages (accessed Mar. 2, 2017).

(Continued)

*Primary Examiner* — Mahesh H Dwivedi
(74) *Attorney, Agent, or Firm* — Klarquist Sparkman, LLP

(57) ABSTRACT

Methods and systems are disclosed for flexibly managing lock modes in a data-sharing environment, including optimistic and pessimistic lock modes. A lock mode determination service receives a request from an application instance for a lock mode with which to access specified data objects. The service can determine and provide a suitable lock mode based on a context of the application, and optionally other parameters, by evaluating a checklist of criteria sorted in precedential order. Criteria can include geo-boundaries, platform, role, and others. The requesting application instance uses the determined lock mode to access the data, with optional assistance of a lock service. The lock mode determination service can support one or more applications having one or more instances each, and can also support multiple disjoint data-sharing environments. Suitable environments include cloud, datacenter, mobile, client-server, and SAAS.

19 Claims, 13 Drawing Sheets

(56) References Cited

U.S. PATENT DOCUMENTS

| | | | |
|---|---|---|---|
| 7,254,578 B2* | 8/2007 | Devarakonda | G06F 9/526 |
| 7,487,152 B1* | 2/2009 | Uceda-Sosa | G06F 17/30362 |
| 8,768,972 B1 | 7/2014 | Wong | |
| 9,052,947 B2 | 6/2015 | Adl-Tabatabai et al. | |
| 9,183,043 B2 | 11/2015 | Dice et al. | |
| 2002/0049961 A1* | 4/2002 | Fang | G06F 8/34 |
| | | | 717/127 |
| 2003/0144980 A1* | 7/2003 | Holmgren | G06F 17/30362 |
| 2004/0133652 A1* | 7/2004 | Miloushev | G06F 11/1076 |
| | | | 709/214 |
| 2006/0123004 A1* | 6/2006 | Rapp | G06F 17/30362 |
| 2006/0123065 A1 | 6/2006 | Rapp | |
| 2006/0136637 A1* | 6/2006 | Goldick | G06F 9/52 |
| | | | 710/200 |
| 2007/0118523 A1* | 5/2007 | Bresch | G06F 17/30362 |
| 2007/0299814 A1* | 12/2007 | Barsness | G06F 17/30442 |
| 2009/0006402 A1* | 1/2009 | Bohle | G06F 9/526 |
| 2009/0204967 A1 | 8/2009 | Bruso et al. | |
| 2009/0282462 A1* | 11/2009 | Skaria | G06F 21/6218 |
| | | | 726/3 |
| 2012/0310881 A1* | 12/2012 | Shadmon | G06F 16/2343 |
| | | | 707/613 |
| 2014/0365549 A1 | 12/2014 | Jenkins | |

OTHER PUBLICATIONS

SAP, Van Heck, "Real-Time Situational Awareness: Turning Data Into Knowledge for the Public Good," https://blogs.sap.com/2014/12/14/real-time-situational-awareness-turning-data-into-knowledge-for-the-public-good/, 5 pages, Dec. 14, 2014 (accessed Mar. 2, 2017).

SAP, "Real Time Situational Awareness (RTSA) Rapid Deployment Solution (RDS) . . . Appliance Based Architecture for OLAP and OLTP Applications," http://sapns2.ispycreative.com/files/pdf/rtsa-solution-brief.pdf, 25 pages, 2012 (accessed Mar. 2, 2017).

Wikipedia, "Lock (Computer Science)," https://en.wikipedia.org/wiki/Lock_(computer_science), 7 pages (accessed Mar. 2, 2017).

Wikipedia, "Readers-Writer Lock," https://en.wikipedia.org/wiki/Readers-writer_lock, 5 pages (accessed Mar. 2, 2017).

EP Application No. 18000136.4, Extended Search Report, dated Aug. 16, 2018, (9 pages).

* cited by examiner

LOCK MODE DETERMINATION SERVICE

BACKGROUND

Different lock modes can be suitable for different data-sharing environments; even within an environment, different lock modes can be suitable for different data clients, different circumstances, and/or different times. As applications and data-sharing environments evolve, there remains a need for improved technologies for managing lock modes in a data-sharing environment.

SUMMARY

In summary, the detailed description is directed to various innovative technologies for supporting a plurality of lock modes for access to shared data. Examples of disclosed technologies use a lock mode determination service to manage lock modes and provide a lock mode that can be determined dynamically or statically based on one or more criteria.

According to one aspect of the innovations described herein, a lock mode is dynamically determined by a lock mode determination service in response to a request received from an application instance. The request can specify one or more data objects to be accessed in accordance with the lock mode. The service determines a lock mode based at least in part on a context of the application instance, and responds to the request with an indication of the determined lock mode. The determined lock mode can be a pessimistic lock mode, an optimistic lock mode, or another lock mode. The response from the lock mode determination service can be transmitted to the requesting application instance, or to a lock service associated with the requested data object.

In examples, the context and lock mode can be determined by evaluating one or more criteria from a list of multiple criteria, whereby both context and lock mode can be determined. In such examples the context evaluation and determination of lock mode can be performed by obtaining the list of multiple criteria, sorting the list in a precedence order, and evaluating the criteria in order of decreasing precedence until the lock mode is determined, which can include terminating the evaluation before all of the multiple criteria have been evaluated.

Exemplary criteria can include parameters of a geo-boundary crossing event, a relationship between a provided location and a geo-boundary, a status of a requested data object, one or more values of requested data object(s), a classification of the data object, an identifier of the application or the application instance from which the request is received, and/or a role or identifier of a user associated with the application instance, in any combination. One or more criteria can be evaluated by custom module(s), which can be application-specific, opaque, pluggable, and/or remote. In examples, information required for evaluation of one or more criteria can be incorporated in, attached to, or transmitted alongside the lock mode request. For example, the request can include (as criteria incorporated into, attached to, transmitted alongside, etc. the request) a location, identifier, or role of the user or application instance, a priority indicator, one or more identifiers of requested data object(s), an event, an identifier of an event log, a platform level indicator, a version number, and/or another parameter, in any combination.

In examples, the determined lock mode can have a scope limited to the particular combination of requested data object and requesting application instance, or the scope can be more broadly applicable. For example, the determined lock mode can be applicable to a range of data objects beyond the requested data object, or the scope can extend to other instances of the application, or to other applications requesting access to the same data object.

In a second aspect, the innovations can be realized as a system including a lock mode determination service and a data store accessible to the lock mode determination service. The data store can hold criteria from which a checklist is formed for use by the lock mode determination service. The lock mode determination service is configured to respond to a lock mode request by sequential evaluation of criteria in the checklist. In examples, the criteria on the checklist can be evaluated by the lock mode determination service in order to determine a lock mode for a received request. In examples, the innovative system can also include a lock service connected to a repository of data objects including one or more data objects associated with a lock mode request. The lock service is configured to respond to a data access request for data object(s), in accordance with a determined lock mode, by determining availability of the data object(s). If the data object(s) are available, the lock service can retrieve the data objects and cause them to be made available to a requesting application instance. The lock mode determination service and the lock mode service can be implemented on a same server, or on different servers.

In an example, a first application instance requests a lock mode for accessing a first data object, and receives an indication of an optimistic lock mode from the lock mode determination service. The first application instance requests access to the first data object from a lock service, according to the optimistic lock mode. The lock service determines that the first data object is available, despite already being accessed by a second application instance, and makes the first data object available to the first application instance. Thereby the first data object is accessible to both the first and second application instances. In a further example, one of the two application instances subsequently makes a change to the data object, whereupon the data object ceases to be available to the other application instance.

In another example, a first application instance requests a lock mode for accessing a first data object, and receives an indication of a pessimistic lock mode from the lock mode determination service. The first application instance requests access to the first data object according to the pessimistic lock mode. The lock service determines that the first data object is unavailable, which could be due to the first data object already being accessed by a second application instance, and does not make the first data object available to the first application instance. Thereby the first data object is accessible to only the second application instance. In a further example, the second application instance completes its access and releases the data object, whereupon the lock service determines that the data object is now available, and makes the data object available to the first application instance. Thereby the first data object is accessible only to the first application instance.

Other example scenarios are considered further below.

In a further aspect, the system comprising the lock mode determination service and data store can serve multiple applications, multiple groups of application instances, and/or multiple data repositories. Accordingly, the data store can store criteria for multiple checklists associated with respective applications, respective instance groups, and/or respective data repositories.

The innovations can be implemented as part of one or more methods, as part of one or more computing systems adapted to perform an innovative method, or as part of non-transitory computer-readable media storing computer-executable instructions for causing a computing system to perform the innovative method(s). The various innovations can be used in combination or separately. The foregoing and other objects, features, and advantages of the invention will become more apparent from the following detailed description, which proceeds with reference to the accompanying figures.

DETAILED DESCRIPTION

Overview

Figure 1:
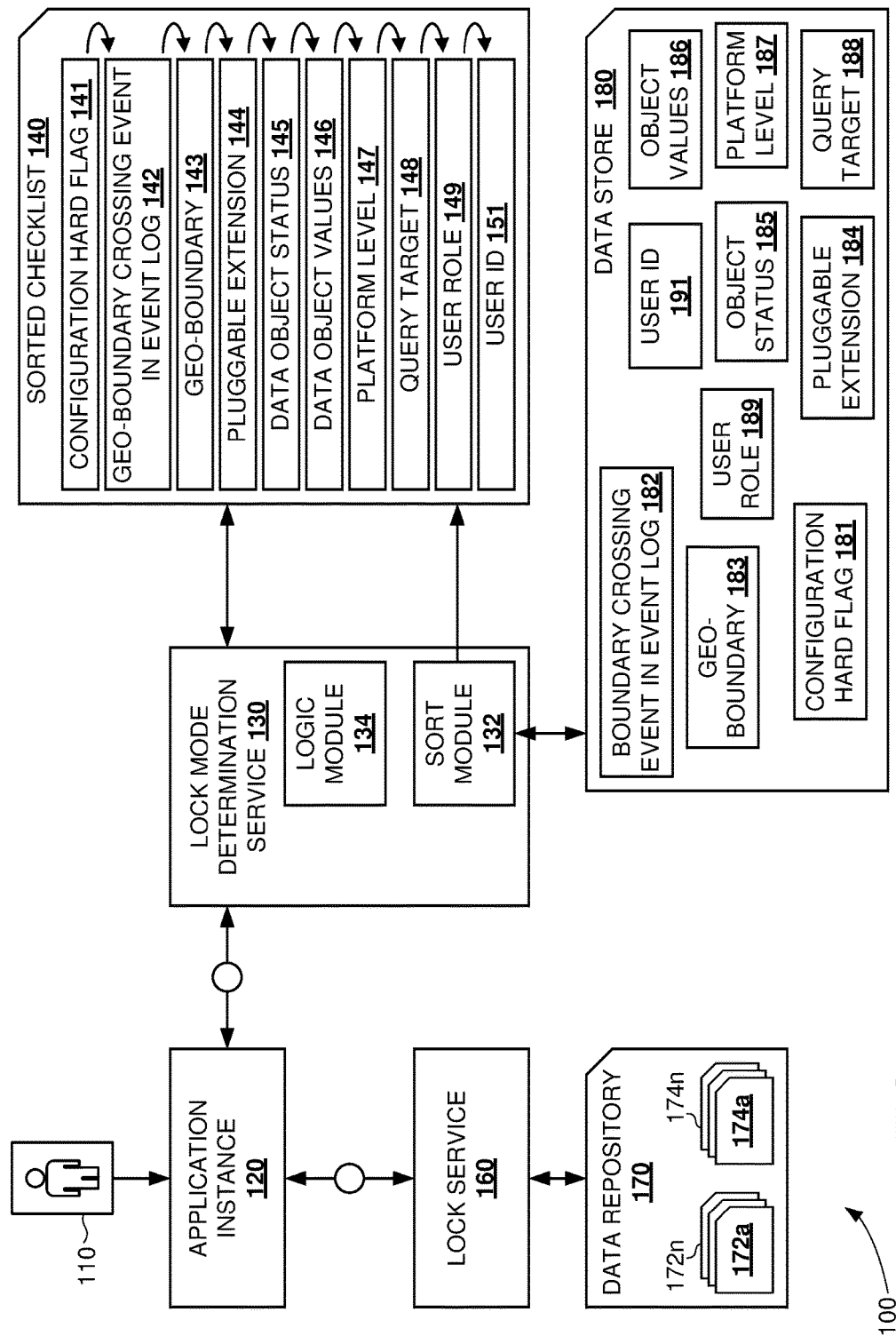
FIG. 1 is a diagram depicting a system and environment according to disclosed technologies.

Concurrent usage of a data object (e.g., data record) can be controlled by using lock modes such as optimistic locking or pessimistic locking. Optimistic locking allows multiple clients to access and read the same data object concurrently. Prior to saving or modifying the data object, a check can be performed to determine whether the data object has already been updated by a different client. A pessimistic lock does not allow a second client to access or read a data object if a first client has started editing, accessing, or reading the data object, because the first client has already locked the data object.

Both approaches have advantages and disadvantages.

In an on-premises environment, pessimistic locking can be preferred, because it demonstrably avoids data conflicts. In some environments, pessimistic locking is a requirement. In such environments, a client can have sole access for editing; other clients can access an updated data object only after the editing client has released the data object, and there is no support for intermediate views of the data object while the editing client has access.

In a cloud environment, however, handling a lock mechanism can be more complex, and can lead to an unacceptable situation of unreleased locks for data objects. Here, optimistic locking can be preferred. With optimistic locking, the advantages of a cloud (such as low Total Cost of Operation) can be preserved, without forgoing locks.

In other environments, the preferred lock mechanism can vary with time, as the context of each client changes, and can also depend on the data being accessed. Further environments can have a wide range of clients, with widely disparate capabilities, roles, and usage patterns. For example, a client can be mobile and battery-powered, requiring a lightweight mechanism (at least in terms of client requirements) to determine the lock mode that applies for data objects.

The disclosed technologies provide sophisticated technologies for flexibly managing lock modes in a wide variety of situations. The provision of a lock mode determination service off-loads responsibility for managing diverse and time-varying needs from individual data clients, supports a single code line for multiple contexts, and provides easy reconfigurability with a single point of maintenance.

Definitions

As used in this disclosure, a "data object" is a structured or unstructured collection of data. A lock mode can be determined for one or more data objects, and access to the one or more data objects can be requested using the determined lock mode. A data object can be a data record, can be all or part of a database or data structure, can comprise one or more fields, can be binary, text, or some other type of data, can be a reference or pointer or identifier, can be a structured or unstructured collection of other data objects, or can be any mixed combination of the above. Data objects are stored in repositories, which can be implemented on hard disk drives, volatile or non-volatile memories, read-only media, and/or in the cloud.

As used in this disclosure, a "lock mode" is a parameter that constrains access to a data object in a shared data environment. The lock mode enables the management of conflicts arising from shared accessibility of the data object. A number of lock modes are possible. With a pessimistic lock mode, only one data client can access the data object at one time; other data clients can wait until the one data client has released its lock on the data object, after which one of the other data clients can take the lock and access the data object. Thus, the lock-holding data client can rely on the fidelity of the data object, because no other data client can have concurrent access. With an optimistic lock mode, multiple data clients can have concurrent access to the data object, optimism lying in a presumption that other data clients will not or are unlikely to modify the data object. In the event that one (or more) of the accessing data clients modifies the shared data object, a reconciliation procedure can be invoked to avoid conflicting states of the data object among the data clients. Other lock modes are also disclosed herein.

As used in this disclosure, an "application" is a computer-implemented program unit. A single application can be instantiated more than once, on the same or on different devices. Alternatively or at times, a single application can have only one instance. An instance of the application is dubbed an "application instance," and can seek a lock mode to access one or more data objects. In some examples, multiple instances of the single application can be running on respective smartphones, tablets, or other portable and/or networked devices. In some examples, access to data objects can be shared between different applications. Different applications can be used in different roles to access, manage, and/or use shared data. In an example of an airline reservation database, different applications can be used by the owner and maintainer of the database, participating airlines, online travel services, travel agents, and travelers. Multiple applications and instances can share one or more lock mode determination services.

In this disclosure, the term "data client" is used from the perspective of a data object or a repository hosting the data object, and refers to any computer-implemented entity, such as an application instance, that can request access to the data object. As such, the term data client is distinct from the role of a client in a client-server application environment. Particularly, a data client can be resident on and executed on a server. In a client-server application environment, one or both of a client-side program and a server-side program can be data clients.

As used in this disclosure, the term "send" denotes any way of conveying information from one component or module to another component/module, and the term "receive" denotes any way of getting information at one component/module from another component/module. The two components/modules can be part of the same computer system or different computer systems. The information can be passed by value (e.g., as a parameter of a message or function call) or passed by reference (e.g., in a buffer). Depending on context, the information can be communicated directly between the two components/modules or be conveyed through one or more intermediate components/modules.

As used in this disclosure, the term "connected" denotes an operable communication link between two components/modules, which can be part of the same computer system or different computer systems. The operable communication link can be a wired or wireless network connection, which can be direct or pass through one or more intermediate components/modules (e.g., of a network).

As used in this disclosure, the term "shared data" refers to any data object that can be accessed by one or more entities such as data clients, whether or not the data object is actually accessed by multiple entities. Particularly, shared data can be accessed by multiple data clients one-at-a-time and need not be accessed concurrently by multiple data clients.

As used in this disclosure, the term "context" of a data client (such as an application instance) includes any information indicating part or all of external circumstances or external properties of the executing software program instructions of the data client. Particularly, the context can include information about a hardware device on which the data client is executing, the operating system, other co-resident software applications, network connectivity, identifiers by which the data client or an associated user is known, the role of the data client or user within the data-sharing environment, groups to which the data client or user belongs, geographic location, and/or associated event logs. Particularly, the context of the data client need not include circumstances or properties reflecting internal conditions of the executing software program instructions of the data client, such as critical code sections. Although the context reflects external circumstances or properties, such information can often be stored by and within the data client or application instance. Although in general properties and parameters of shared data objects are not part of a data client's context, the context information can be stored in a shared data repository so as to be visible to other data clients in the shared data environment and to a lock mode determination service—in the latter case, shared data objects containing context information can be part of the data client's context.

An Example System and Environment

FIG. 1 is a diagram depicting a system and environment (together, 100) according to disclosed technologies. In the depicted example, a user 110 is associated with an application instance 120. In various examples, the application instance 120 can be executing on a mobile device or other computing device under direct control of the user 110, or the application instance 120 can be executing under an account of a logged-in user 110 on a computing device. User 110 is not a necessary feature of the disclosed technologies; application instance 120 can be running in an autonomous mode, as is often encountered in an Internet-of-Things (IoT) environment.

During operation, the application instance 120 can require access to shared data objects 172*a-m* or 174*a-n* in one or more data repositories 170. In the depicted example this data access is provided using a lock mode determination service 130 and a lock service 160. As described above, shared data can be accessed using locks to minimize or avoid conflicts; different lock modes can be used, and a suitable lock mode can vary according to a context of an application instance seeking access to the shared data, and/or according to other parameters. In brief, lock mode determination service 130 assists with dynamic determination of the suitable lock mode, and lock service 160 manages access to the shared data according to the suitable lock mode determined by the lock mode determination service 130.

Lock mode determination service 130 can use a data store 180, containing one or more criteria 182-189 and 191 which can be relevant to a determination of the suitable lock mode. Lock mode determination service 130 can also use a sorted checklist 140 which comprises multiple criteria 141-149 and 151 from data store 180, sorted in a precedence order. The criteria in sorted checklist 140 can include all or merely some of the available criteria in data store 180. In some examples, the lock mode determination service includes a sort module 132 that is operable to prepare the sorted checklist 140 from the criteria in data store 180. The sort module 132 can be operated periodically, on an event-triggered basis such as an external command or a configuration update, or more often, up to and including at every lock mode request. Alternatively, the sorted checklist 140 includes other and/or additional criteria. The sorted checklist 140 typically includes criteria, and orders those criteria, as appropriate for a particular use scenario.

Each criterion can be implemented as a function designed to evaluate that criterion. Alternatively, one or more criteria can be implemented as a parameter set that serves as input to a general purpose criterion evaluation engine (not shown). Exemplary criteria are described further below. Based on the criteria evaluation, logic module 134 of the lock mode determination service 130 is operable to determine a suitable lock mode for the current request. The lock mode determination service 130 is operable to respond to the request by providing indication of the determined lock mode.

During operation, application instance 120 can utilize a lock mode received from lock mode determination service 130 to access some data object(s) among shared data objects 172*a-m* or 174*a-n*. In the example system, application instance 120 is operably connected to data repository 170 through a lock service 160. Lock service 160 is operable to manage access to and retrieve the shared data objects 172*a-m* or 174*a-n* of data repository 170 in accordance with one, two, or more possible lock modes. The lock service 160 can be operable to respond to the data access request by making the requested data object available to the requesting application instance. Thus, upon receipt of a data access request from application instance 120 specifying one or more shared data objects and one or more determined lock modes, the lock service 160 can, according to circumstance, respond by providing access to a requested data object immediately (if the data object is immediately available using the corresponding determined lock mode), by providing access to the requested data object when the data object becomes available (using the specified lock mode) after a delay, or by returning an error, busy, or denial signal (if the data object is or remains inaccessible using the specified lock mode).

With this disclosure in hand, one of ordinary skill in the art will appreciate that the depicted environment 100 can be extended with one or more lock services 160 supporting one or more data repositories 170 in any combination. Generally, any relationship shown by arrows in FIG. 1 can be 1:1, or M:1, or 1:N, or M:N, for any positive integers M or N. The person of ordinary skill will further appreciate that many other variations of the depicted system and environment are possible within the scope of disclosed innovations. Lock mode determination service 130 and lock service 160 can be implemented on the same server or different servers; for some methods described below, a direct link between these services can be implemented. In other examples, one or more of lock service 160, sort module 132, and data store 180 can be omitted. The person of ordinary skill will also appreciate that various entities depicted in FIG. 1 can be implemented with computer-readable instructions stored on computer-readable media and executed by associated computing devices such as servers, mobile devices, and in the cloud.

Example Evaluation of Criteria

The criteria in sorted checklist 140 are organized from top to bottom in decreasing precedence. Thus, top-most criterion 141 can be applied first, followed by criterion 142, and so forth, down to bottom-most criterion 151. The curved arrows from one criterion to the next indicate the successive application of the depicted criteria. As described herein, it is not necessary for all criteria to always be applied or evaluated; once the lock mode determination service arrives at a determination of the lock mode, evaluation of further criteria can be dispensed with. Criteria can be evaluated in various orders, depending on implementation.

The lock mode determination service 130 can also include a logic module 134, which collects context and other parameter information from the evaluation of criteria from sorted checklist 140 and based upon this information makes a determination of the lock mode. In examples, the logic module 134 can also directly use inputs provided by the application instance 120.

Figure 9:
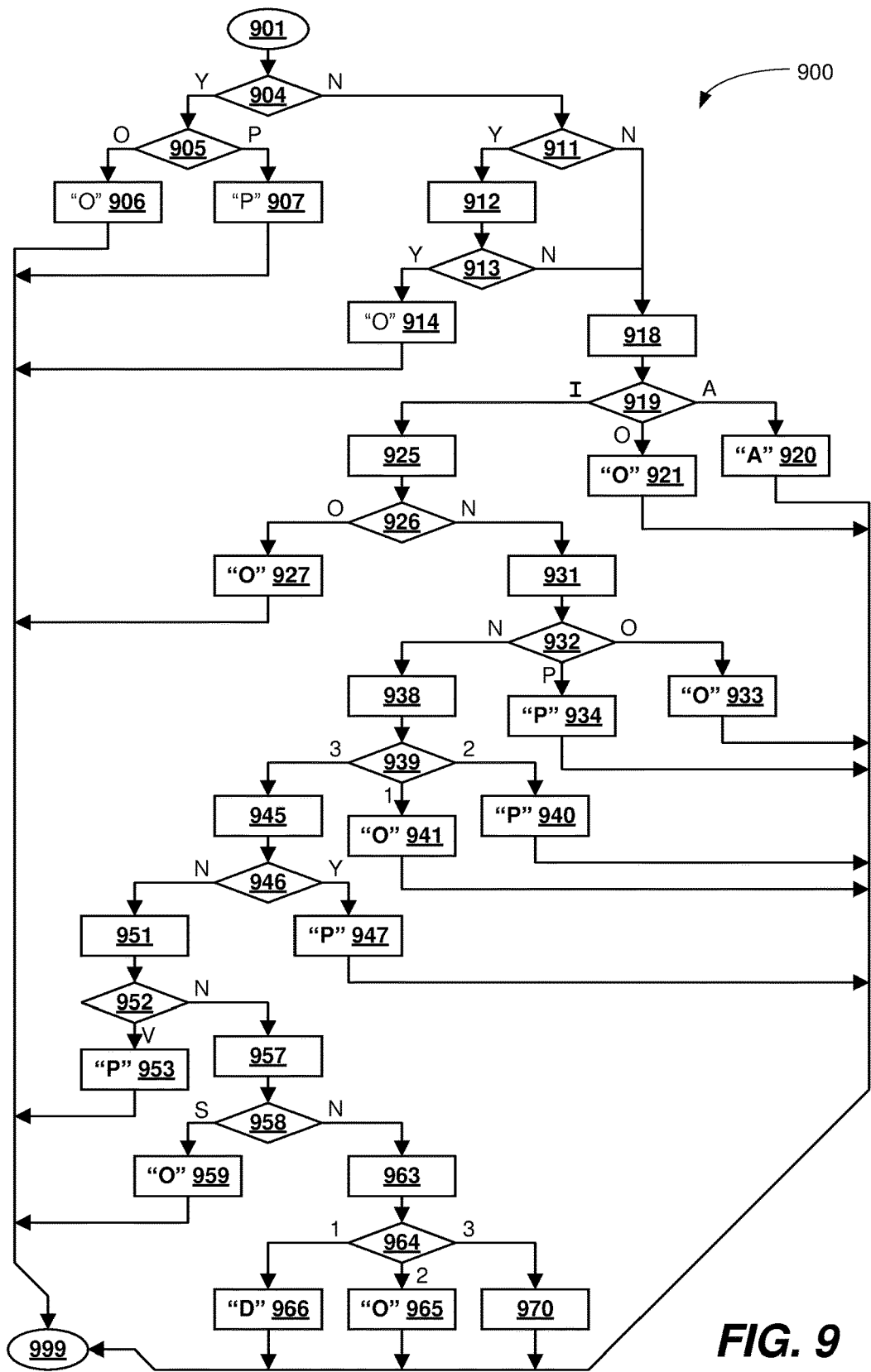
FIG. 9 is a flowchart of a method of evaluation of criteria and determination of a lock mode, according to disclosed technologies.

FIG. 9 depicts a flowchart 900 of a method for evaluation of a lock mode by lock mode determination service 130, using sorted checklist 140. The method of flowchart 900 can substantially be performed by logic module 134. The following description combines different examples, purely for the sake of illustration. The method begins at 901.

In the depicted example, criterion 141 is labeled configuration hard flag. This criterion can be evaluated by checking (904) whether a flag has been set that provides an overriding ("hard") determination of the lock mode for a particular application or environment. In some examples, a hard lock mode setting can be used to handle abnormal or special circumstances, which can include maintenance of any part of the system or environment, new software rollout, high system load, low system load, or detected security threats. If a hard lock mode flag is set, the logic module 134 can determine (905) which flag has been set (i.e., which lock mode to use). Thus, the lock mode is determined to be optimistic ("O"; 906) or pessimistic ("P"; 907); with the lock mode determined, the method terminates (999). Commonly, a hard lock mode can be used to force a pessimistic lock mode.

If no hard lock mode was set (branch N of 904), the method proceeds to 911 and criterion 142, which is labeled geo-boundary crossing event in event log. This criterion can be evaluated by checking (911) whether an event log associated with the application instance 120 contains a geo-boundary crossing event, and further evaluating the event (912) to classify a present location of the application instance 120. For example, application instance 120 can be executing on a mobile device for which position monitoring is enabled. Position monitoring can be provided within the application instance, or separate from the application instance but co-resident on the same mobile device, or as a separate remote service hosted on a server or in the cloud. Alongside, a graph or collection of geo-boundaries can be configured for the application. When the position monitoring detects that the mobile device has crossed a geo-boundary, then an event can be recorded in an event log associated with the application instance 120. In such an environment, criterion 142 can be evaluated by determining (911) whether a geo-boundary crossing event is present in the event log for application instance 120. This evaluation can be limited by a duration (for example, within the last hour or within the last 24 hours) or by a number of events (for example, within the last ten logged events). If no qualifying event is found (branch N), then evaluation proceeds to the next criterion (143; 918) in the sorted checklist 140. If a qualifying event is found (branch Y), then the event is evaluated (912) in order to classify the present location of the mobile device and selectively (913) assign an optimistic lock mode (914) or continue evaluation. For example, in a law enforcement scenario, if the mobile device of an investigating police officer is found to be outside the office (913 branch Y), then logic module 134 can assign an optimistic lock mode (914) in order to increase the likelihood of the officer being able to immediately access required data objects. Conversely, if the investigating police officer is within the office (913 branch N), then evaluation can proceed to the next criterion (143; 918) in sorted checklist 140.

Criterion 143 is labeled simply geo-boundary. This criterion can be evaluated by determining (918) the location of the mobile device hosting application instance 120 and comparing (919) with one or more defined geo-boundaries. Following the preceding example, one geo-boundary can be configured along an office perimeter, while another geo-boundary can be configured around a priority location such as a disaster area or an unfolding crime scene. Near the priority location (branch A), the application instance 120 can receive a priority lock mode ("A"; 920) allowing application instance 120 to steal another data client's pessimistic lock on requested data objects and take an optimistic lock on the data objects. In other, out-of-office, locations (branch O), the application instance 120 can receive an optimistic lock as before (921), and for in-office locations (branch I), evaluation proceeds to the next evaluation criterion (144; 925).

Criterion 144 is labeled pluggable extension. This criterion can be evaluated by execution of the pluggable extension (925), with zero, one, or more input parameters that the pluggable extension is configured to receive. In a law enforcement environment, for example, a participating agency can choose to provide a pluggable extension for reasons of security (to shield user information or information about investigations). As another example, in an airline reservation environment, a participating airline can choose to provide a pluggable extension as a computer-executable black box function for its own users. The pluggable extension can be used for reasons of security or competitive secrecy. For example, the airline could provide improved access based on a user's frequent flyer status, but could be reluctant to disclose this feature. In the example depicted, the pluggable extension can indicate use of an optimistic lock mode; this is checked at 926; if such indication is found (branch O), then optimistic lock mode is determined (927), otherwise the method continues to the next criterion (145; 931).

Criterion 145 is labeled data object status. This criterion can be evaluated by determining (931) a status (e.g., classification) of one or more requested data objects. For example, the classification of a first data object could be "in use—optimistic", while the classification of a second data object could be "in use—pessimistic." These conditions are checked at 932; an "in use—optimistic" data object (branch O) can be accessed with an optimistic lock mode (933) to allow immediate access. If the condition of the requested data object is "in use—pessimistic" (branch P) can be accessed with a pessimistic lock mode (934) since an optimistic lock may not yield immediate access anyway. Alternatively (not shown), the "in use—pessimistic" path can proceed to evaluation of another criterion (e.g., to check whether the lock in pessimistic lock mode should be revoked from the other data client in favor of the requesting data client). Other status conditions (e.g., "not in use") can flow through to evaluation of the next criterion (146; 938). Different status indications and classifications can be used in criterion 145, including freshness (time of last update, updated within last hour or within last day), confidentiality (restricted access, general availability), object type (string, link, numeric).

Criterion 146 is labeled data object values. This criterion can be evaluated (938) by determining and classifying a present value of a requested data object or another data object associated with the requested data object. The data object value can be checked 939, and a lock mode can be selectively assigned depending on the data value. The data object value may indicate that problem conflicts are impossible or very unlikely (branch 1, such that optimistic lock mode (941) is assigned), that problem conflicts are very likely (branch 2, such that pessimistic lock mode (940) is assigned), or that more evaluation is needed (branch 3, such that evaluation continues at the next criterion 147; 945). For example, in a law enforcement scenario, a request for access to information could depend on the type of investigation. As another example, in an airline reservation system, a request for seat availability on a flight can be handled differently depending on whether there are 50 seats available, one seat available, or the flight is full. The 50 seats and full flight cases are unlikely to lead to any problem conflicts and can be suitable for proceeding to the next criterion and optimistic lock mode respectively, while the one seat case could be better handled using a pessimistic lock mode.

Criterion 147 is labeled platform level. This criterion can be evaluated by determining (945) a level of the platform or device on which application instance 120 is executing. For example, cloud and server data clients can be handled differently, Windows™, macOS™ and/or iOS™ devices can be handled differently, or different Android™ versions can be handled differently. Cloud environments are susceptible to conflict issues; hence, enforcing pessimistic locking for cloud deployment can be an important consideration. The same application running on-premise in a data center can avail itself of optimistic or flexible lock modes. In the example shown, if a cloud platform is found (946 branch Y), then pessimistic lock mode is set at 947, otherwise (branch N), the method proceeds to the next criterion (148; 951).

Criterion 148 is labeled query target. Similar to criterion 145, this criterion can be evaluated by determining (951) the classification of one or more requested data objects. However, criterion 145 is concerned with the status of a requested data object, which can refer to any data object; the status can also change over time, can change multiple times, and can change frequently. In contrast, criterion 148 is concerned with the identity of a requested data object, which usually does not change. For example, a particular first data object can be classified as "critical" or "volatile" which can lead to use of a pessimistic lock mode in order to minimize the likelihood of a conflict, while a different second data object can be classified as "low-value" or "stable." The second data object can be accessed using an optimistic lock mode, and accepting the possibility of a modification of the data object, with an ensuing reconciliation procedure. In the example shown, if the requested data object is volatile (952; branch V) then pessimistic lock mode is set at 953; otherwise (branch N) the method proceeds to the next criterion (149; 957).

Criterion 149 is labeled user role. This criterion can be evaluated by determining (957) a role associated with application instance 120 or user 110. As discussed herein, access by a supervisor can be handled differently from access by clerical staff. In examples where multiple applications can access shared data (for example, different applications for different user roles), an identifier of the application can be used as a criterion (not shown). In the example shown, if the user role is supervisor (958; branch S) then optimistic lock mode is set at 959; otherwise (branch N) the method proceeds to the next criterion (151; 963).

Criterion 151 is labeled user ID. This criterion can be evaluated by determining (963) an identifier associated with application instance 120 or user 110, and further matching the identifier (964) against a table of users. Depending on the evaluation, optimistic lock mode (965) can be assigned, or access to the requested data object can be denied (966), or evaluation can continue (970). For example, in an airline reservation system, certain travelers or travel agents can be white-listed or black-listed, and this can be used as a factor in determining their lock mode. A white-listed traveler (964 branch 2) can receive an optimistic lock (965), a black-listed traveler (964 branch 1) is denied access to the data (966), and other travelers (964 branch 3) can proceed to any further criteria (970). In another example, the user ID can be checked against properties of the requested data objects: if the user ID matches the owner of the data object, then this can be used as a factor in determining a lock mode. For example, an IoT sensor can be given priority access to its own reported data.

As the criteria in sorted checklist 140 have been exhausted, a default value (such as pessimistic lock) is assigned (970), and the method terminates (999).

As described above, evaluation of criteria can require knowledge of parameters such as those associated with the requesting data client or a requested data object. Parameters can be included with the lock mode request, in particular geo-location or other parameters indicative of the context of the data client. Other parameters can be provided to the lock mode determination service at the time of registering a data client with the lock mode determination service, for example, the platform level or user ID associated with the data client. Parameters can also be requested by separate query from the lock mode determination service, in particular those parameters associated with requested data objects. In examples, the lock mode determination service can issue a query to the data repository hosting a data object, or to an associated lock service. In other examples, requests for required parameters can be issued to an environment manager that is responsible for maintaining status information related to some or all of entities such as data clients, data repositories, services, applications, and/or data stores in a data-sharing environment.

In some examples, the evaluation of criterion 143 (or of any other criterion) does not lead to any direct determination of the lock mode, but rather provides context information that can be combined with evaluations of other criteria by logic module 134 in order to determine a lock mode.

A First Example Method

Figure 2:
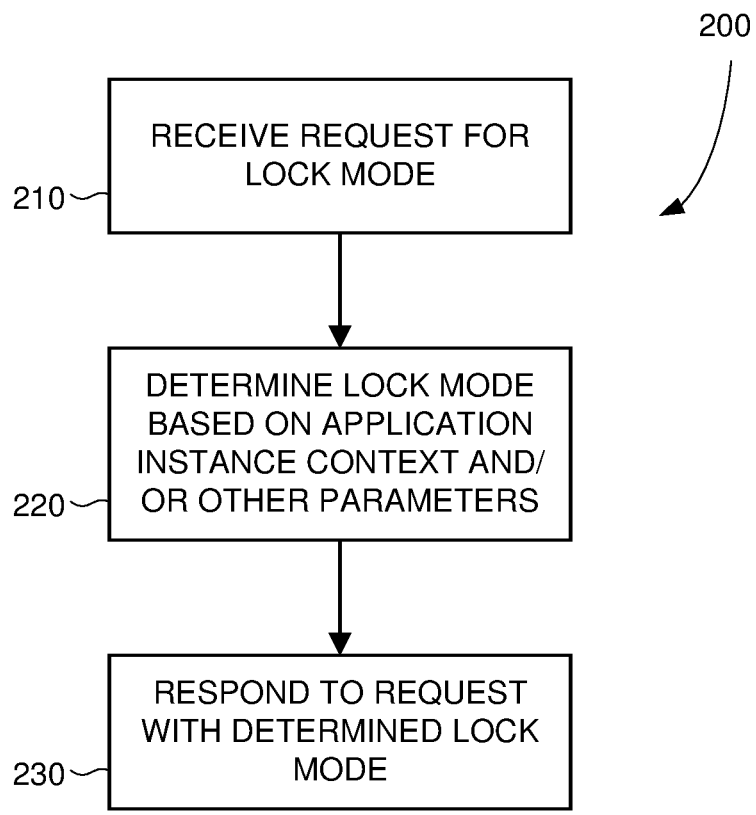
FIG. 2 is a flowchart of a method of operation of a lock mode determination service according to disclosed technologies.

FIG. 2 is a flowchart 200 of a method of operation of a lock mode determination service according to disclosed technologies. At process block 210, the service receives a request for a lock mode. The request can identify one or more data objects to be accessed using the requested lock mode. At process block 220, the lock mode determination service utilizes context information of the application instance and optionally other parameters to determine a lock mode. For example, if the mobile device hosting the application instance is determined to be roaming, it can be given an optimistic lock mode, whereas if the mobile device hosting the application instance is at a home location, it can be given a pessimistic lock mode. At process block 230, the lock mode determination service provides a response to the lock mode request that identifies the determined lock mode.

A Second Example Method

Figure 3:
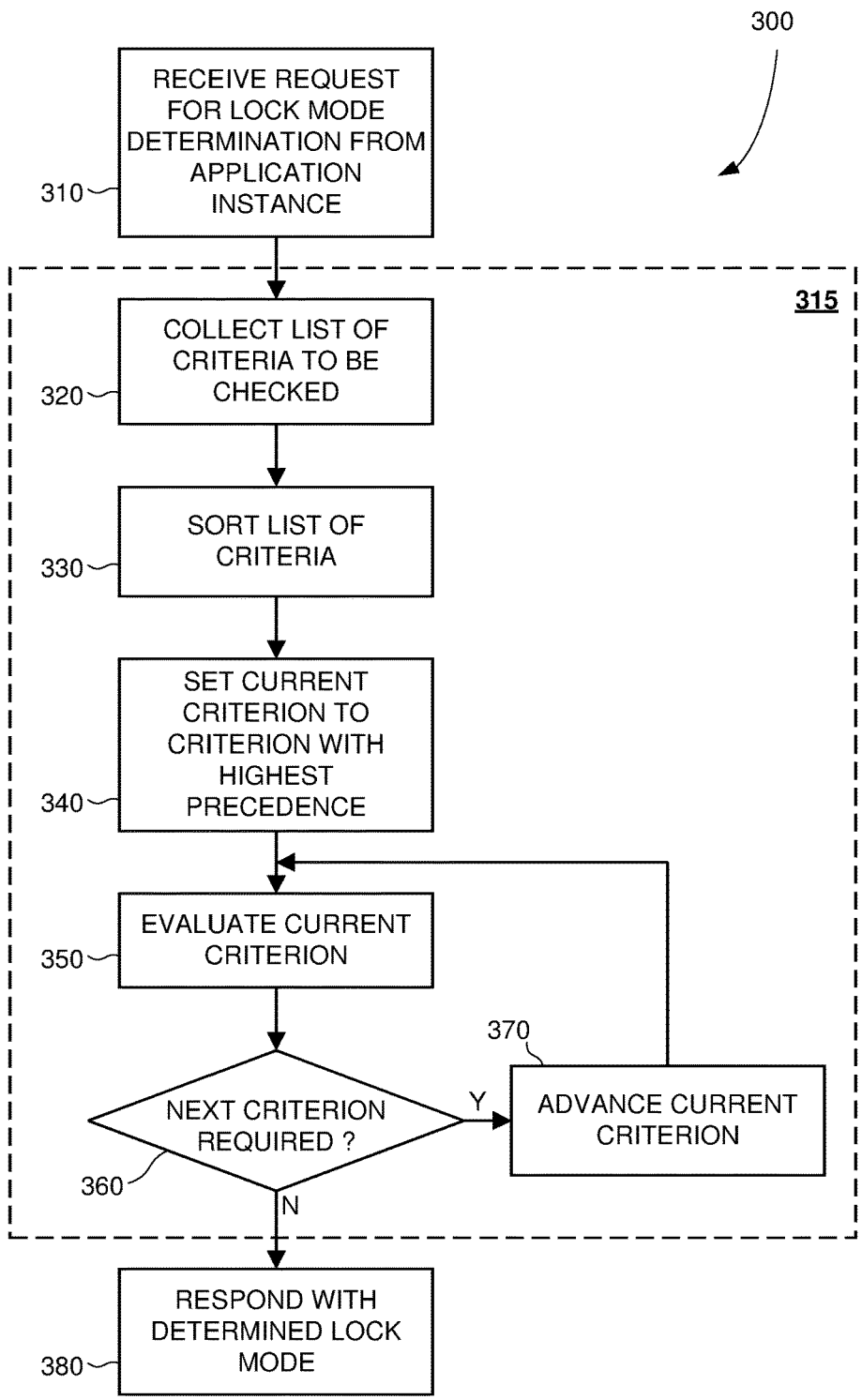
FIG. 3 is a flowchart of another method of operation of a lock mode determination service according to disclosed technologies.

FIG. 3 is a flowchart 300 of another method of operation of a lock mode determination service according to disclosed technologies. At process block 310, the lock mode determination service receives a request for a lock mode determination from an application instance. Dashed outline 315 encompasses a set of process blocks 320-370 which collectively correspond to a lock mode determination procedure. At process block 320, a list of criteria is obtained for the request. At process block 330, the criteria are sorted in a precedence order. For example, depending on the usage scenario, the role of the requesting application instance or its user can have a higher precedence than a geographic location of the mobile device hosting the application instance. As another example, an application instance belonging to a supervisor can preferentially receive an optimistic lock mode regardless of location, while an application instance of clerical staff can receive an optimistic lock mode while roaming, and a pessimistic lock mode at home.

At process block 340, an evaluation procedure is initialized by starting with the highest precedence criterion. At process block 350, the current criterion is evaluated, which can provide at least a partial determination of the context of the requesting application instance and/or can lead to a determination of the lock mode for the request. Following the example above, the role of the requesting application instance is part of the application instance's context, so that evaluation of the role provides information about the application instance's context. If the role is found to be that of a supervisor, then the lock mode can also be determined to be an optimistic lock mode, while if the role is found to be clerical staff, then further evaluation can be necessary.

Accordingly, after the current criterion is evaluated at process block 350, a check is made at process block 360 whether any further criteria need to be evaluated. Usually, evaluation of further criteria can be required if the lock mode is as yet undetermined. On the other hand, if a lock mode has been determined, the lock mode determination service provides a response with the determined lock mode at process block 380. Other situations are possible. If the list of criteria is exhausted without determination of the lock mode, then there is no next criterion and the check at process block 360 can return a failure condition. This circumstance can be handled in a variety of ways, including, for example, by responding with a default lock mode, such as a pessimistic lock mode, or by responding with an error message, such as Request Denied, or by retrying the request starting at process block 340 after a predetermined wait period. In another example situation, the lock mode may be determined, but evaluation of one or more following criteria can be required by policy. For example, a criterion evaluation can have side effects, such as logging statistics, and evaluation of this criterion can be mandatory. Alternatively, a policy can require all criteria to be evaluated regardless of determinateness of the lock mode.

If the determination at process block 360 is Yes, then the current criterion is advanced to the next criterion at process block 370, and the method loops back to process block 350 to evaluate this next criterion. If the determination at process block 360 is No, then the evaluation of criteria is terminated, which can occur before all criteria in the list have been evaluated as described above. In a normal case, the lock mode is determined at this point, and the lock mode determination service provides a response with the determined lock mode at process block 380. However, as described above, situations can arise where process block 360 determines No due to a failure condition, and the lock mode is as yet undetermined. To handle such situations, further checking and exception handling can be introduced between process blocks 360 and 380 (not shown).

In some examples, the response from the lock mode determination service can be addressed to the requesting application instance, but this is not a necessary feature. In other examples, the response can be forwarded directly as a data access request to a lock service for access to the desired data object(s). In such examples, the lock mode determination service acts as a forwarding agent: the lock mode determination service receives a combined request for lock mode determination and data access from an application instance, appends a determined lock mode to part or all of the original request to form a data access request, and forwards the data access request to a lock service for access to one or more data objects specified in the original request. In further examples, the response from the lock mode determination service can be broadcast or multicast, providing other application instances and/or other applications with visibility on accessed data object(s) and their associated lock modes.

A Third Example Method

Figure 4:
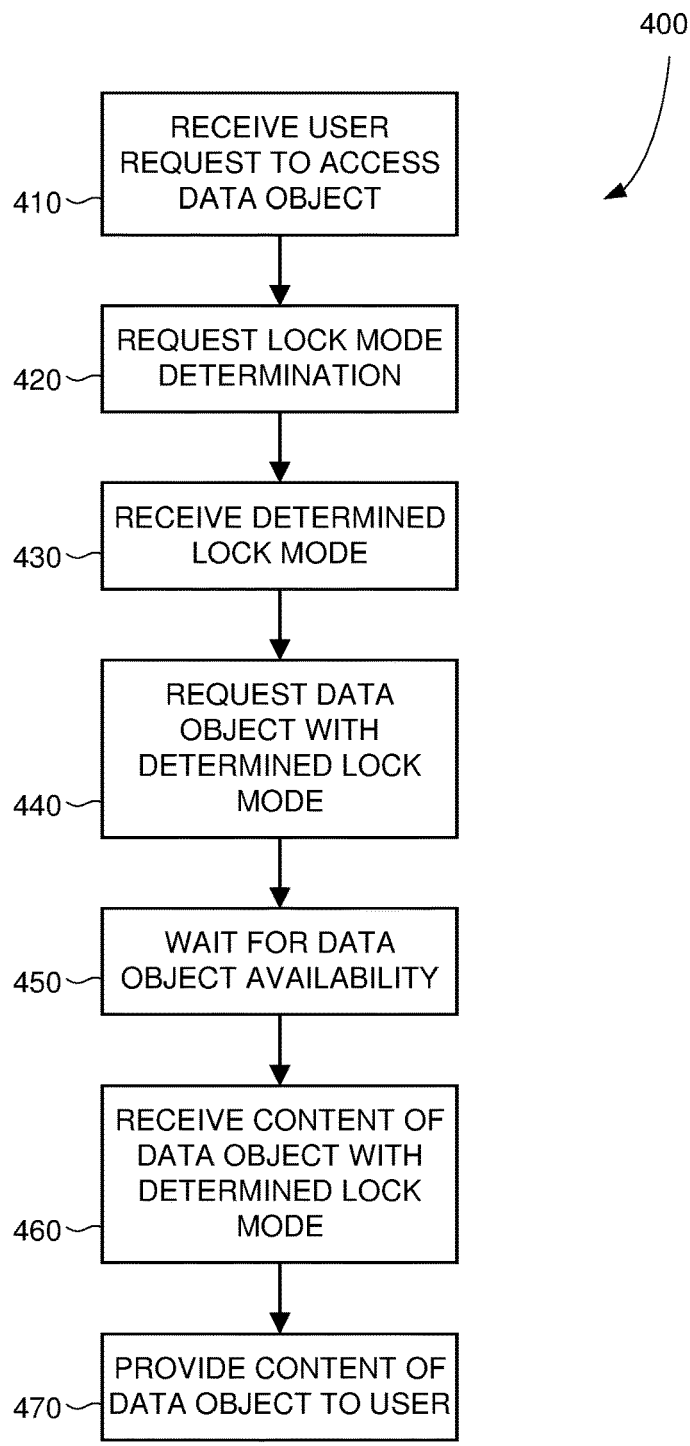
FIG. 4 is a flowchart of a method of operation of an application instance according to disclosed technologies.

FIG. 4 is a flowchart 400 of a method of operation of an application instance according to disclosed technologies. At process block 410, the application instance receives a request from a user requiring access of one or more data objects. In some examples, the user's request can explicitly call for accessing the data object(s), while in other examples, the user's request can be for performing a function which requires access to the data object(s). In some examples, the user's request can require accessing multiple data objects and can be handled as a plurality of requests for individual ones of the multiple data objects and/or subgroups of the multiple data objects. For example, two requested data objects can be hosted in separate data repositories or be of different types or classes, and therefore require separate lock mode determinations. In other examples, some of the requested data objects can already be in use by the application instance, or some of the requested data objects can have lock modes that are already known to the application instance, as can happen if these requested data objects have been recently accessed. In further examples, some of the requested data objects may not require a lock mode for access. In other examples, the user's request can require access to one or more data objects that are parts of a larger data object; such a request can be handled as a single request for the larger data object.

Responsive to the user's request, and subject to the considerations described above, the application instance issues a lock mode determination request at process block 420 to a lock mode determination service. In some examples, the request identifies a data object, access to at least part of which is required to satisfy the user's request. The lock mode determination request can identify more than one data object, or it can omit identification of any data object. The latter situation can arise in environments where the data access requirements of an application instance have little or no variation. Some Internet-of-Things (IoT) applications are like this; an IoT node could only need to check for availability of an update, or could only need to report a single sensed variable, with the identity of the data object implied for any request. The request lock mode determination can also include other parameters, as described further herein.

At process block 430, the application instance receives an indication of the determined lock mode from the lock mode determination service, whereupon the application instance issues a data access request at process block 440, using the determined lock mode, for a data object within scope of the lock mode determination request. In some examples, the data access request is issued to a lock service that is operably connected with a repository containing the requested data object. In various examples, the lock service can be a stand-alone service, or the lock service can be co-hosted with one or both of the data repository or the lock mode determination service. In other examples, the lock service is co-hosted with the application instance, or can be embedded within the application instance. In the latter case, lock management is handled within the application instance and the data access request is transmitted directly from the application instance to the data repository.

At process block 450, the application instance waits for the requested data object to become available under the determined lock mode. This wait can be minimal, involving merely processing and transmission delays, if the requested data object is already available. Alternatively, the wait can be longer if the requested data object is not immediately available under the determined lock mode, and can even time out and return an error (not shown). The unavailability of the requested data object can occur if the data object is already in use under a restrictive lock mode such as a pessimistic lock, or if the data object is already in use in any lock mode other than the determined lock mode. Usually, if the determined lock mode is optimistic lock mode and the data object is being accessed by optimistic lock mode, then the data object can be immediately available, but even this situation can have exceptions, for example, if the data object has been modified by an accessing data client, and a reconciliation procedure has been invoked, leading to temporary unavailability of the data object.

In many circumstances, the wait of process block 450 terminates successfully with availability of the requested data object, and the application instance can receive the data object content at process block 460. In some examples, the content of the data object can be provided directly in response to the data access request, while in other examples the response to the data access request contains merely a token, key, link, or reference to the requested data object, which can be used in a subsequent transaction to retrieve the data object from a hosting data repository. Commonly, what is received is a copy of the content of the data object, with the original data object remaining intact in the hosting repository, although this is not a requirement of the disclosed innovations. "Receiving the data object" can be a convenient short-hand, as can be understood by one of ordinary skill in the art.

Finally, at process block 470, the content of the data object can be provided either directly to a user (for example, by on-screen display), or can be provided indirectly to the user. The latter situation can arise when the user has invoked a function requiring access of the data object. In this and similar situations, the received data object content can be provided to the function, which can provide output visible to the user, or can provide explicit or implicit indication of function completion.

The lock on the data object can be released, after completion of access by the user or the application instance or the user-invoked function. Alternatively, access to the data object can be lost upon modification by another data client, as described herein in the context of reconciliation procedures. Access can also be lost when access is granted for a specified time duration, which expires.

A First Example Sequence Diagram

Figure 5:
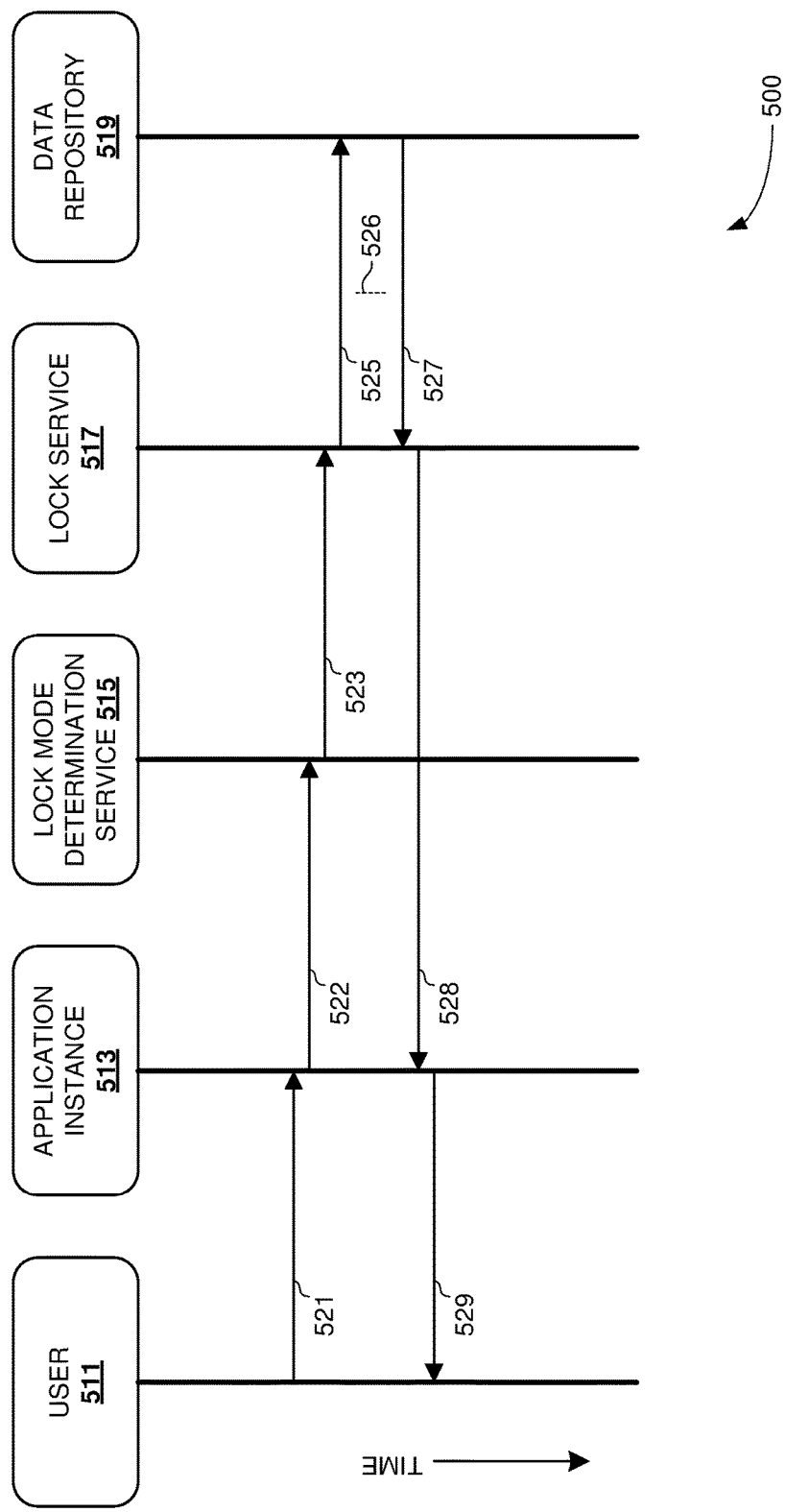
FIG. 5 is a sequence diagram of a method for utilizing a lock mode determination service and a lock service to access a data repository, according to disclosed technologies.

FIG. 5 is a sequence diagram 500 of a method for utilizing a lock mode determination service 515 and a lock service 517 to access a data repository, according to disclosed technologies. At 521, a user 511 issues a request to an application instance 513. The request is received by the application instance 513 similarly to process block 410 described above. At 522, the application instance 513 issues a lock mode request (combining a lock mode determination request and data access request), for a data object associated with user request 521, to lock mode determination service 515, similarly to process block 420 described above. At 523, the lock mode determination service 515 combines all or part of the lock mode request with the determined lock mode and forwards a data access request to lock service 517. At 525, the lock service 517 seeks access to the data object from data repository 519 in accordance with the determined lock mode, which can include at least checking whether the data object is available using the determined lock mode. Dashed line 526 represents a short or long wait as could be needed before the data object is available for access. Upon availability, contents of the data object are returned to the lock service at 527. At 528, the lock service 517 fulfills the data access request and provide the data object content directly to the application instance 513. Finally, at 529, the data object content is made available directly or indirectly to the user 511, similarly to process block 470 described above.

In this sequence diagram, the lock mode determination service 515 does not respond directly to the requesting application instance 513. Rather the lock mode determination service 515 forwards a data access request directly to lock service 517. Further, the lock service 517 does not provide the requested data object content to the entity from which it received a data access request, but rather provides the requested data object content directly to the requesting application instance 513. Although not necessary, these features reduce the messaging required for data access.

A Second Example Sequence Diagram

Figure 6:
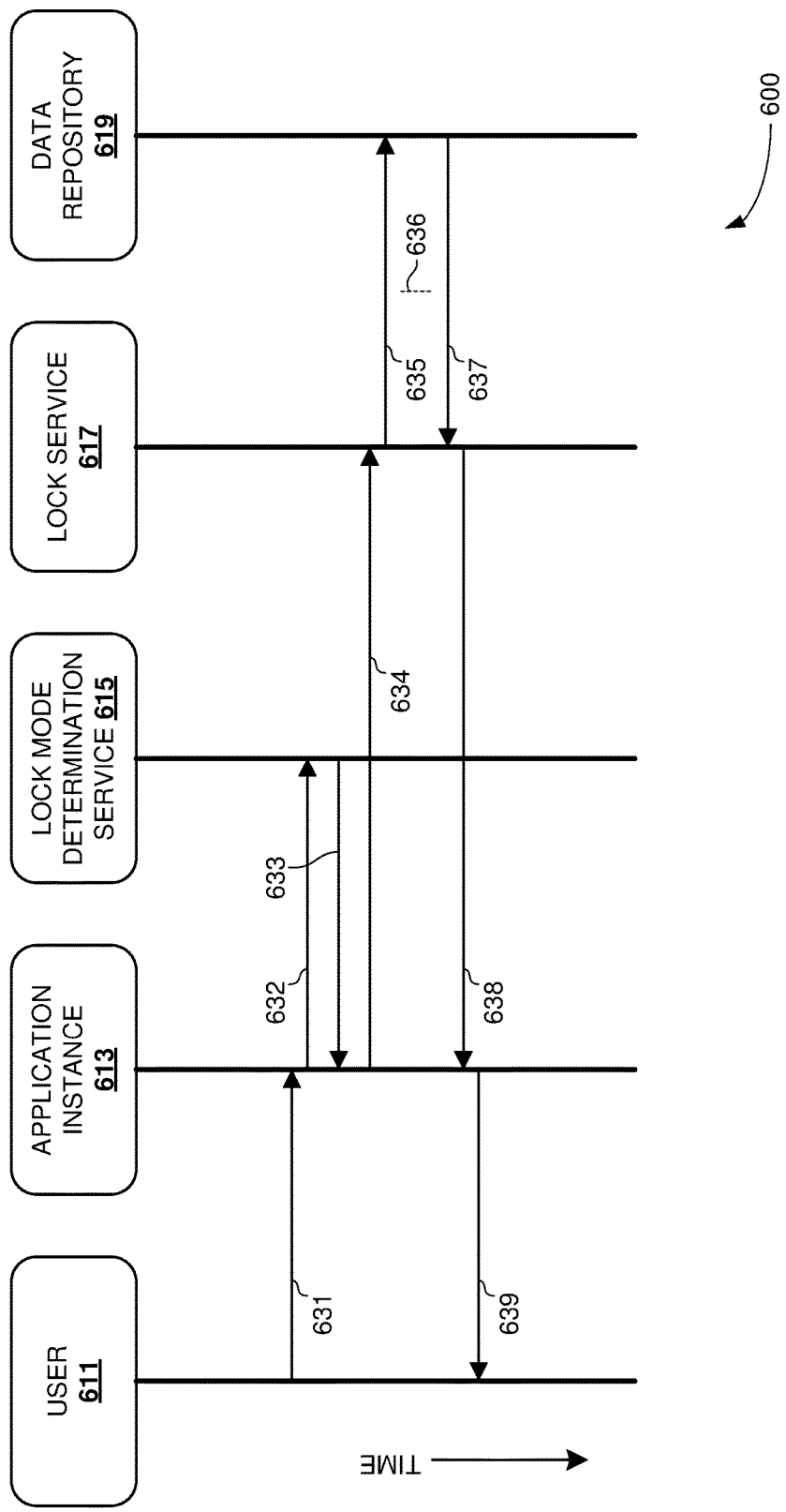
FIG. 6 is a sequence diagram of another method for utilizing a lock mode determination service and a lock service to access a data repository, according to disclosed technologies.

FIG. 6 is a sequence diagram 600 of another method for utilizing a lock mode determination service 615 and a lock service 617 to access a data repository, according to disclosed technologies. At 631, a user 611 issues a request to application instance 613. The request is received by the application instance 613 similarly to process blocks 410 or 521 described above. At 632, the application instance 613 issues a lock mode request (in this case, a lock mode determination request), for a data object associated with user request 631, to lock mode determination service 615, similarly to process blocks 420 or 522 described above. At 633, the lock mode determination service 615 responds to the requesting application instance 613 with an indication of the determined lock mode. The determined lock mode is received by the application instance 613 similarly to process block 430 described above. Then, at 634, the application instance 613 issues a data access request to lock service 617, requesting access to the data object according to the determined lock mode, similarly to process block 440 described above. At 635, the lock service 617 seeks access to the data object from data repository 619 in accordance with the determined lock mode, similarly to 525 described above. Dashed line 636 represents a short or long wait as could be needed before the data object is available for access, similar to process blocks 450 or 526 described above. Upon availability, contents of the data object are returned at 637 to the lock service 617, similarly to 527 described above. At 638, the lock service 617 can fulfill the data access request and provide the data object content to the application instance 613, similarly to 528 described above. Finally, at 639, the data object content can be made available directly or indirectly to the user 611, similarly to process blocks 470 or 529 described above.

Unlike the sequence diagram of FIG. 5, responses in FIG. 6 are returned to the requesting entity. This provides improved accountability and traceability; each responder is directly accountable to its requestor, and a requestor such as application instance 613 can monitor its responder and raise precise alerts as necessary.

A Third Example Sequence Diagram

Figure 7:
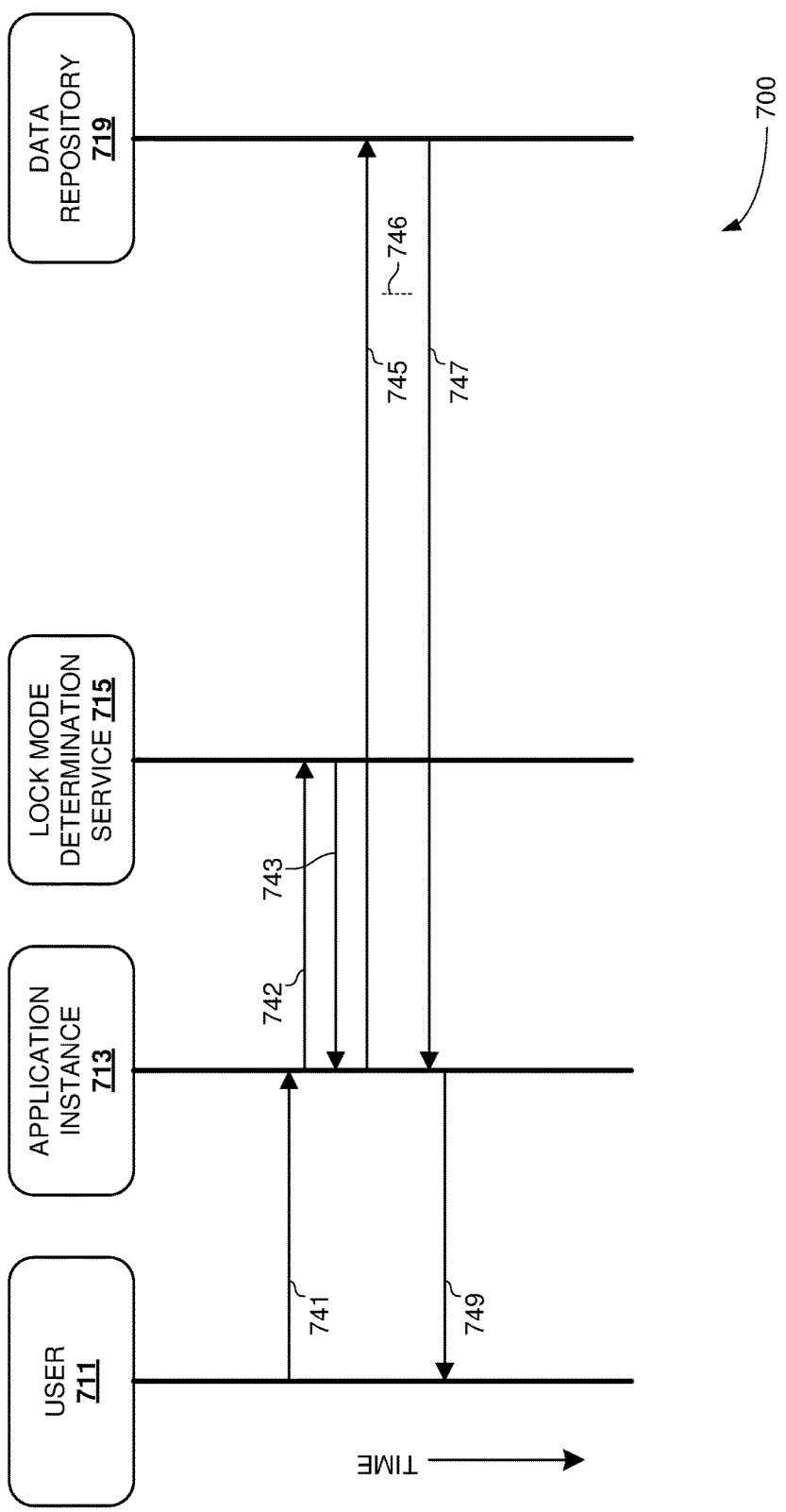
FIG. 7 is a sequence diagram of a method for utilizing a lock mode determination service to access a data repository, according to disclosed technologies.

FIG. 7 is a sequence diagram 700 of a method for utilizing a lock mode determination service to access a data repository, according to disclosed technologies. Unlike sequence diagrams 500 and 600, sequence diagram 700 does not utilize a distinct lock service. Features of a lock service, such as checking data object availability, or keeping track of the lock status of one or more data objects, or invoking a reconciliation procedure in case of a data object modification during shared access, can be incorporated within requesting application instance 713 or data repository 719, in any combination.

At 741, a user 711 issues a request to application instance 713. The request is received by the application instance 713 similarly to process blocks 410 or 521 described above. At 742, the application instance 713 issues a lock mode request (in this case, a lock mode determination request), for a data object associated with user request 741, to lock mode determination service 715, similarly to process blocks 420 or 522 described above. At 743, the lock mode determination service 715 responds to the requesting application instance 713 with an indication of the determined lock mode. The determined lock mode is received by the application instance 713 similarly to process block 430 described above. Then, at 745, the application instance 713 issues a data access request directly to data repository 719 in accordance with the determined lock mode. Dashed line 736 represents a short or long wait as could be needed before the data object is available for access, similar to process blocks 450 or 526 described above. Upon availability, contents of the data object are returned at 747 directly to the application instance 713. Finally, at 749, the data object content can be made available directly or indirectly to the user 711, similarly to process blocks 470 or 529 described above.

Sequence diagram 700 provides direct handshakes between requestor (the application instance 713) and its responders, with advantages similar to sequence diagram 600 described above. Sequence diagram 700 also provides a reduced number of messages, with advantages similar to sequence diagram 500 described above. Meanwhile sequence diagrams 500 and 600 utilize distinct lock services 517 or 617, which offers different advantages. Particularly, a discrete lock service is advantageous where data objects can be distributed, with or without replication, among multiple data repositories.

A Second Example System and Environment

With this disclosure in hand, one of ordinary skill in the art will appreciate that the lock mode determination service 130 is not limited to supporting a single application or environment, but can be shared among multiple distinct applications and/or environments. Accordingly, where FIG. 1 shows single instances of sort module 132, logic module 134, data store 180, and sorted checklist 140, in other examples a plurality of sort modules, logic modules, data stores, and sorted checklists can be provided for a single instance of a lock mode determination service to support respective applications and/or environments. For reasons of confidentiality and security, entities associated with one application or environment can be partitioned separately from the corresponding entities associated with another application or environment.

Figure 8:
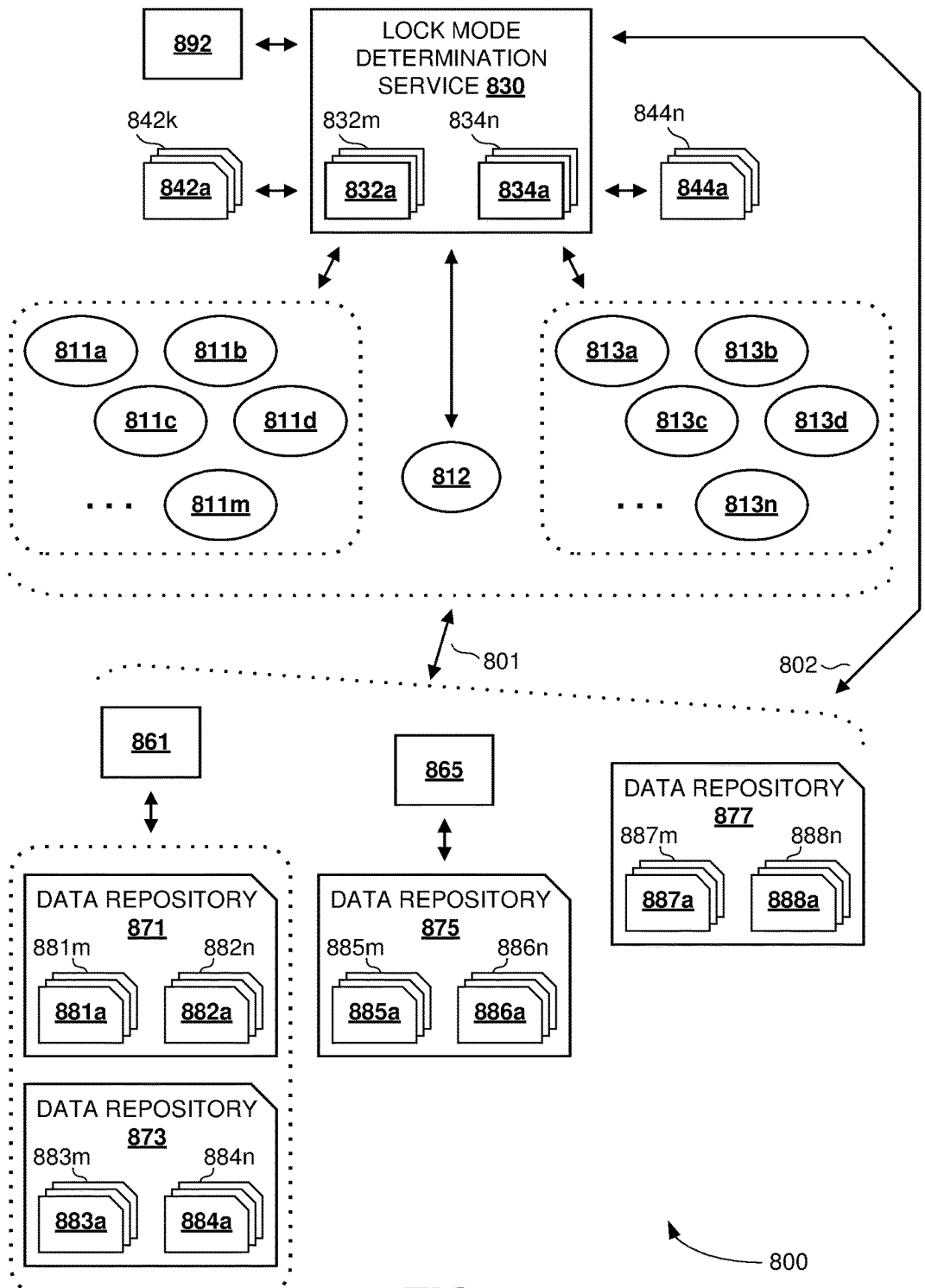
FIG. 8 is a diagram depicting a system and environment according to disclosed technologies.

FIG. 8 is a diagram depicting another system and environment (together, 800) according to disclosed technologies. In FIG. 8, lock mode determination service 830 incorporates a plurality of logic modules 834a-n and their associated sorted checklists 844a-n. The sorted checklists 844a-n are derived from data stores 842a-k (analogous to data store 180) by sort modules 832a-m. Lock mode determination service 830 also has access to environment manager 892 as a resource from which to obtain various parameters associated with data client context and/or required for evaluation of criteria as described herein.

Data clients 811a-m are instances of a first application, while data clients 813a-n are instances of a second application. Unlike the first or second applications, 812 is the sole instance of a third application. Any of these application instances can act as data clients and can issue lock mode requests to lock mode determination service 830. In FIG. 8, the dotted outlines are merely conveniences for illustration, used to indicate that an arrow indicating connectivity to a dotted outline actually extends to some or all of the entities shown within a dotted outline. The dotted lines do not indicate any further logical grouping, physical proximity, or association.

Shared data 881-888a-m,n is shown hosted in a plurality of repositories 871, 873, 875, and 877. Lock service 861 provides locks and data access for shared data within data repositories 871 and 873, while lock service 865 supports data repository 875. Data repository 877 is accessed without a lock service, as described with regard to FIG. 7 and elsewhere herein. Arrow 801 indicates that lock services 861, 865 and data repository 877 can be accessed from some or all of data clients 811a-m, 812, or 813a-n. Arrow 802 indicates that lock services 861, 865 and data repository 877 can additionally or alternatively be accessed from lock mode determination service 830. The connectivity represented by arrow 802 can support an operational sequence illustrated in FIG. 5 or 6, or can allow the lock mode determination service 830 to examine properties of shared data objects as can be required to evaluate some criteria. Not shown in FIG. 8 are additional connections for environment manager 892, which in examples can be operably connected to some or all of the depicted entities.

Additional Exemplary Features

1. Structure of a Request

Figure 10:
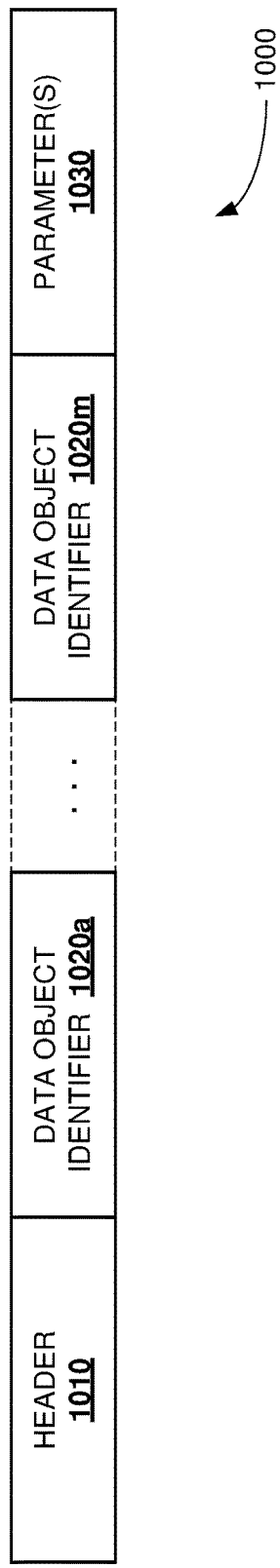
FIG. 10 is a diagram of a request to a lock mode determination service.

FIG. 10 is a diagram of an example request 1000 from a data client (such as a requesting application instance) to a lock mode determination service. Optional header 1010 can provide information including zero, one, or more of: a sequence number, an identity of the requesting data client, protocol, version number, or length of the request. Optional identifiers 1020a-m indicate the data object(s) for which a lock mode is being requested. In some environments, each request can specify exactly one data object. Optional parameters 1030 can include zero, one, or more of: parameters required for evaluation of a criterion checklist by the lock mode determination service (such as geographic location, an identifier of an event log associated with the requesting data client, a user ID, an application instance ID, a user role, a priority indicator, an event, a platform level indicator, or a version number), or other parameters such as the duration for which access is sought, or an indication of access type (read-only, read-write). Many variations of the depicted request structure 1000 are possible: for example, pieces of header information can be grouped with the parameters or vice versa, or parameters can be provided separately for each requested data object or groups of data objects, or the fields of the request can be rearranged or incorporated into a data structure.

2. Structure of a Response

Figure 11:
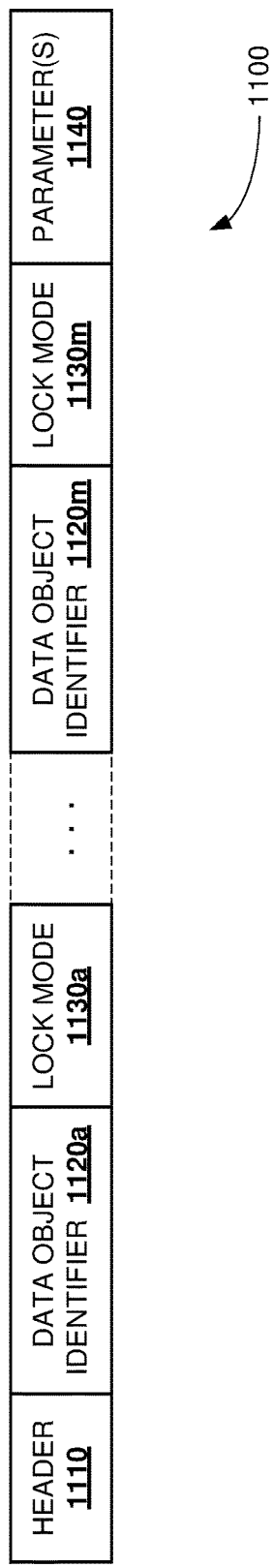
FIG. 11 is a diagram of a response from a lock mode determination service.

FIG. 11 is a diagram of an example response 1100 from a lock mode determination service. Optional header 1110 can provide information including zero, one, or more of: a sequence number, an identity of the requesting data client, an identifier of the request, an identity of the responding service, protocol, version number, or length of the response. Optional identifiers 1120a-m indicate the data object(s) for which a lock mode is being provided. In situations where a request provides zero or one data object or where the response contains at most one lock mode field, the data object identifier can be omitted. Lock mode indicators 1130a-m provide corresponding lock modes for the associated data objects identified by identifiers 1120a-m. Optional parameter(s) 1140 can include zero, one, or more parameters such as duration of validity of the lock mode(s) provided. Many variations of the depicted request structure 1100 are possible: for example, pieces of header information can be included with the parameters or vice versa, or the fields of the response can be rearranged or incorporated into a data structure.

3. Scope of a Determined Lock Mode

In examples, the determined lock mode can have a scope limited to a particular request. The same application instance requesting the same data object a second time can trigger a re-evaluation of the determined lock mode by a lock mode determination service. In other examples, the lock mode does not need to be re-evaluated at each request. The validity of a determined lock mode can be based on time, such as time since the determination was evaluated, or time since last request by the requesting application instance, or time since last request by any data client. In this case, the validity of a determined lock mode can persist until cleared by expiration of a timer or duration associated with the request. Alternatively, the validity of a determined lock mode can persist until cleared by an event such as an update of the checklist, or a software update, or a reset or power cycle of the requesting application instance.

In some examples, the scope of a determined lock mode can extend to a group of application instances, all instances of a particular application, or group(s) of instances of group(s) of applications, where a group can be one, two, or more entities. The scope of a determined lock mode can also extend in a "peer-wise" manner to a plurality of data objects, such as all fields of a record, or all data objects of a particular status, classification, or group, or the scope of a determined lock mode can extend hierarchically to a super-object of which the requested data object is a part.

In some examples, the scope of a determined lock mode is maintained at the data object level: once assigned by a request from an application instance, the determined lock mode is fixed, so that other requestors can see the same lock mode (regardless of whether the other requestors have similar context as the application instance to which the determined lock mode has been assigned). In such examples, the release of access to a data object by a first requestor can release the lock mode for the data object, after which a lock mode request from a different application instance can lead to a different determined lock mode.

4. Reconciliation Procedure

In some circumstances, two data clients can have concurrent access to a data object (particularly, under optimistic lock mode), and one or both can make a modification of that data object. To avoid conflict, a reconciliation procedure can be used. In an example, the modifying data client can take sole access of the data object immediately upon modification, and the other sharing data clients can lose access to the data object. Alternatively, the other data clients can receive the modified data object. The other data clients can see a change in a portion of a display corresponding to the modified data object (for example, this portion can be grayed out or blinking), with or without some visibility of the old or new value of the data object. In other examples, the modifying data client can cause an alert to be issued to the other data clients, which can allow the other data clients a time-limited opportunity to block the modification by the modifying data client.

In other circumstances, two or more sharing data clients can attempt to make a modification to a shared data object substantially concurrently (meaning, before a first modification transaction has completed). In such a case, a conflict resolution procedure can be used to systematically allow one of the modifications to complete while any other modification is rejected.

Other variations of reconciliation can be provided. Different forms of notification can be provided among the sharing data clients, the lock service, and the hosting data repository.

5. Lock Modes

With this description in hand, one of ordinary skill will appreciate that the disclosed technologies can be used with a number of variants, sub-types, and alternatives besides simple optimistic and pessimistic locking modes. For example, one or more of sequence lock, readers-writer lock, priority lock, lock stealing, demand lock, and intent lock can be used.

6. Locks

Locks can be implemented between a lock service and a data repository using various techniques, including any combination of physical locks, logical locks, seqlocks, or spinlocks.

A Generalized Computer Environment

Figure 12:
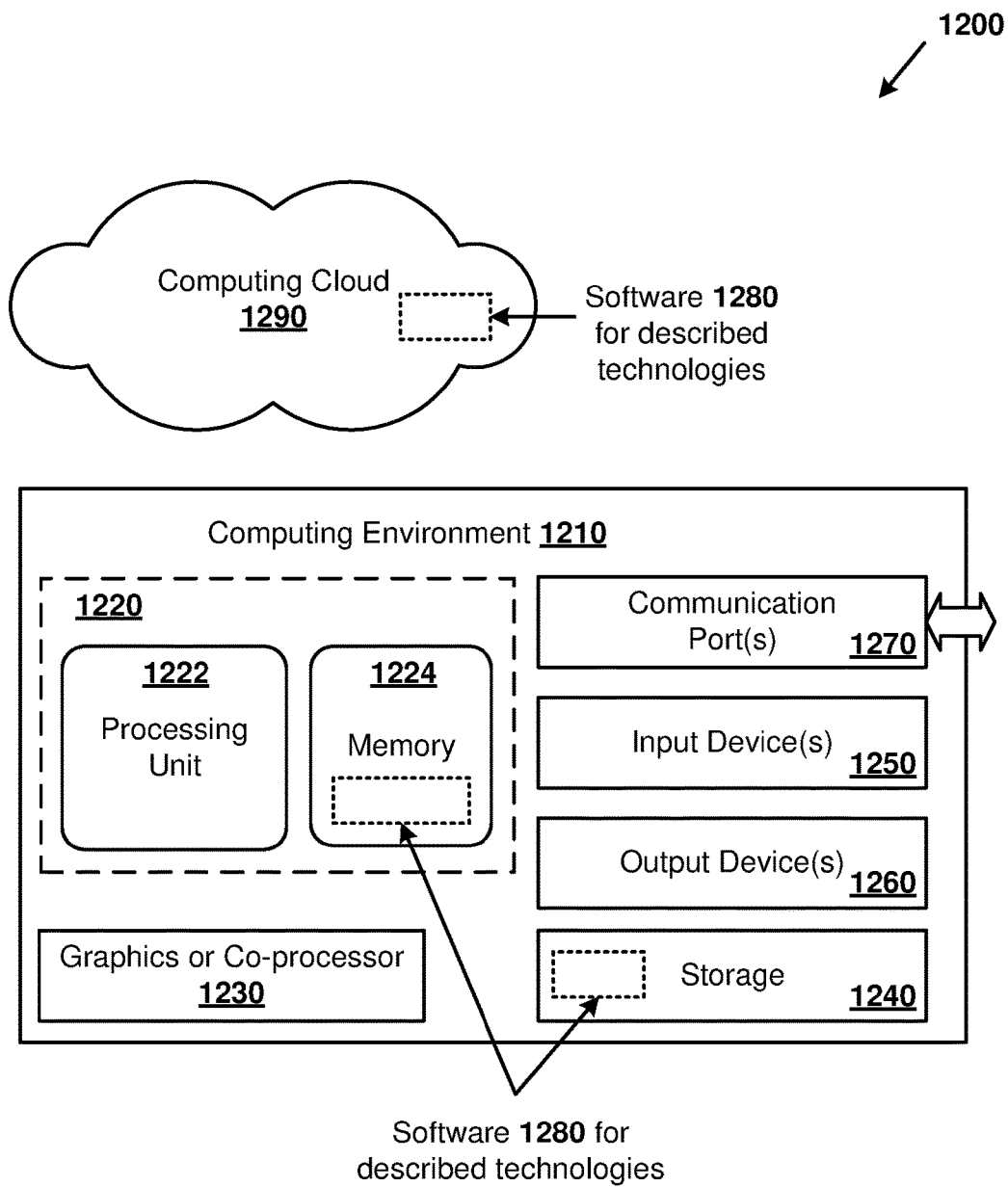
FIG. 12 is a diagram schematically depicting a computing environment suitable for implementation of disclosed technologies.

FIG. 12 illustrates a generalized example of a suitable computing system 1200 in which described examples, techniques, and technologies, including construction, deployment, operation, and maintenance of a lock mode determination service, can be implemented. The computing system 1200 is not intended to suggest any limitation as to scope of use or functionality of the present disclosure, as the innovations can be implemented in diverse general-purpose or special-purpose computing systems.

With reference to FIG. 12, computing environment 1210 includes one or more processing units 1222 and memory 1224. In FIG. 12, this basic configuration 1220 is included within a dashed line. Processing unit 1222 executes computer-executable instructions, such as for implementing components of application instance (e.g., 120, 513, 613, or 713), lock mode determination service (e.g., 130), lock service (e.g., 160), or various other architectures, components, handlers, managers, modules, and repositories described herein. Processing unit 1222 can be a general-purpose central processing unit (CPU), processor in an application-specific integrated circuit (ASIC), or any other type of processor. In a multi-processing system, multiple processing units execute computer-executable instructions to increase processing power. Computing environment 1210 can also include a graphics processing unit or co-processing unit 1230. Tangible memory 1224 can be volatile memory (e.g., registers, cache, or RAM), non-volatile memory (e.g., ROM, EEPROM, or flash memory), or some combination thereof, accessible by processing units 1222, 1230. The memory 1224 stores software 1280 implementing one or more innovations described herein, in the form of computer-executable instructions suitable for execution by the processing unit(s) 1222, 1230. The memory 1224 can also store database data, including some or all of data repository (e.g., 170) or data store (e.g., 180). The memory 1224 can also store some or all of sorted checklist (e.g., 140), and other configuration and operational data.

A computing system 1210 can have additional features, such as one or more of storage 1240, input devices 1250, output devices 1260, or communication ports 1270. An interconnection mechanism (not shown) such as a bus, controller, or network interconnects the components of the computing environment 1210. Typically, operating system software (not shown) provides an operating environment for other software executing in the computing environment 1210, and coordinates activities of the components of the computing environment 1210.

The tangible storage 1240 can be removable or non-removable, and includes magnetic disks, magnetic tapes or cassettes, CD-ROMs, DVDs, or any other medium which can be used to store information in a non-transitory way and which can be accessed within the computing environment 1210. The storage 1240 stores instructions of the software 1280 (including instructions and/or data) implementing one or more innovations described herein.

The input device(s) 1250 can be a mechanical, touch-sensing, or proximity-sensing input device such as a keyboard, mouse, pen, touchscreen, or trackball, a voice input device, a scanning device, or another device that provides input to the computing environment 1210. The output device(s) 1260 can be a display, printer, speaker, optical disk writer, or another device that provides output from the computing environment 1210.

The communication port(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 1200 can also include a computing cloud 1290 in which instructions implementing all or a portion of the disclosed technology are executed. Any combination of memory 1224, storage 1240, and computing cloud 1290 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, neither term implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in one or another form of physical computer hardware.

An Example Cloud Computing Environment

Figure 13:
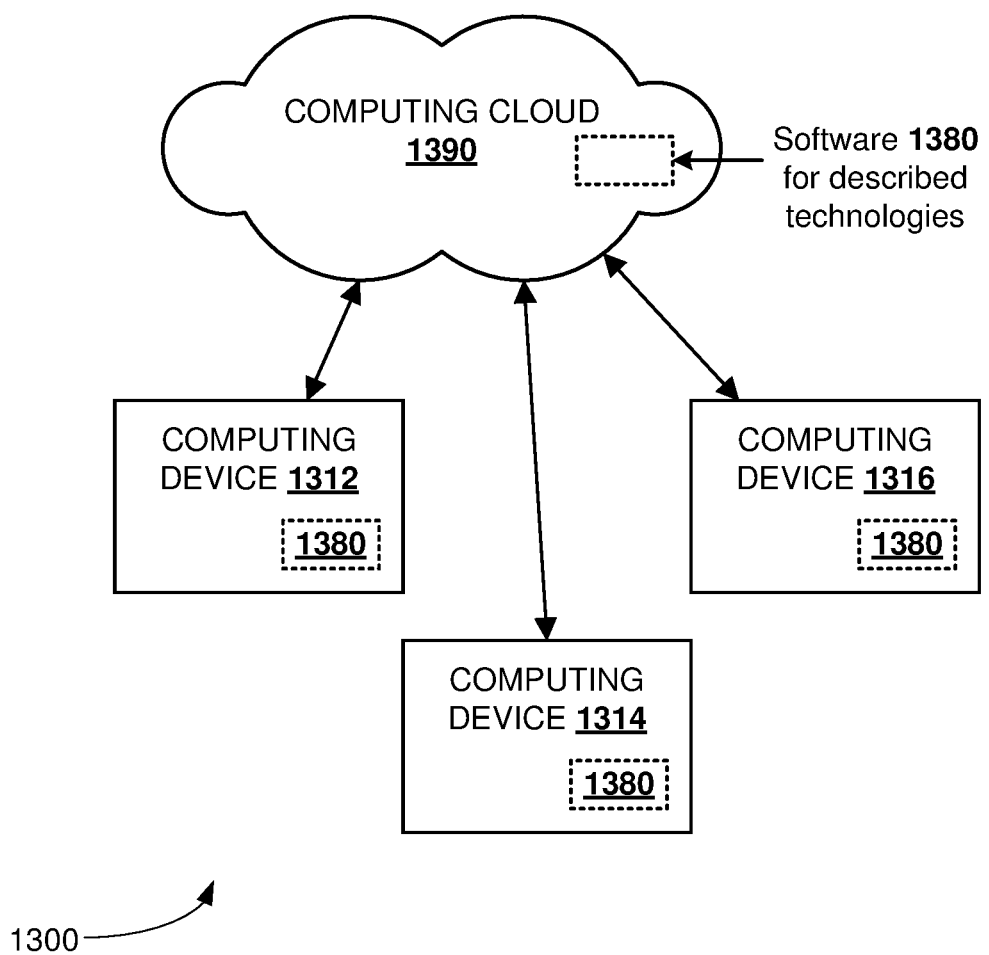
FIG. 13 is a diagram schematically depicting computing devices operating in conjunction with a computing cloud for implementation of disclosed technologies.

FIG. 13 depicts an example cloud computing environment 1300 in which the described technologies can be implemented. The cloud computing environment 1300 comprises a computing cloud 1390 containing resources and providing services. The computing cloud 1390 can comprise various types of cloud computing resources, such as computer servers, data storage repositories, networking resources, and so forth. The computing cloud 1390 can be centrally located (e.g., provided by a data center of a business or organization) or distributed (e.g., provided by various computing resources located at different locations, such as different data centers and/or located in different cities or countries).

The computing cloud 1390 can be operatively connected to various types of computing devices (e.g., client computing devices), such as computing devices 1312, 1314, and 1316, and can provide a range of computing services thereto. One or more of computing devices 1312, 1314, and 1316 can be computers (e.g., server, virtual machine, embedded systems, desktop, or laptop computers), mobile devices (e.g., tablet computers, smartphones, or wearable appliances), or other types of computing devices. Connections between computing cloud 1390 and computing devices 1312, 1314, and 1316 can be over wired, wireless, or optical links, or any combination thereof, and can be short-lived or long-lasting. These connections can be stationary or can move over time, being implemented over varying paths and having varying attachment points at each end. Computing devices 1312, 1314, and 1316 can also be connected to each other.

Computing devices 1312, 1314, and 1316 can utilize the computing cloud 1390 to obtain computing services and perform computing operations (e.g., data processing, data storage, and the like). Particularly, software 1380 for performing the described innovative technologies can be resident or executed in the computing cloud 1390, in computing devices 1312, 1314, and 1316, or in a distributed combination of cloud and computing devices.

General Considerations

As used in this disclosure, the singular forms "a," "an," and "the" include the plural forms unless the context clearly dictates otherwise. Additionally, the terms "includes" and "incorporates" mean "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and nonobvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "apply," "determine," "evaluate," and "use" to indicate computer operations in a computer system. These terms denote actual operations that are performed by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 12, computer-readable storage media include memory 1224, and storage 1240. The term computer-readable storage media does not include signals and carrier waves. In addition, the term computer-readable storage media does not include communication ports (e.g., 1270) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, C, C++, C#, Curl, Dart, Fortran, Java, JavaScript, Julia, Lisp, Matlab, Octave, Perl, Python, R, Ruby, SAS, SPSS, SQL, WebAssembly, any derivatives thereof, or any other suitable programming language, or, in some examples, markup languages such as HTML or XML, or in any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer-implemented method for dynamically determining a lock mode for accessing a data object, the method comprising:
    receiving, at a lock mode determination service, a request from an instance of an application to determine a lock mode;
    determining, with the lock mode determination service, the lock mode based on context of the instance of the application; and
    sending, from the lock mode determination service, a response to the requesting instance of the application, the response indicating the determined lock mode, wherein the sending precedes determining availability of the data object according to the determined lock mode.

2. The computer-implemented method of claim 1, wherein the context of the instance of the application can be evaluated using one or more criteria from a list of multiple criteria, and wherein the determining the lock mode based on the context of the instance of the application includes:
    obtaining the list of multiple criteria, wherein the multiple criteria in the list are sorted in precedence order;
    evaluating the one or more criteria from the list in order of decreasing precedence; and
    upon the lock mode being determined, terminating the evaluating.

3. The computer-implemented method of claim 2, wherein the multiple criteria include one or more of:
    one or more parameters of a geo-boundary crossing event,
    a relationship between a provided location and a geo-boundary,
    a status of the data object,
    one or more values of the data object,
    a classification of the data object,
    an evaluation of a pluggable extension,
    an identifier of the application,
    an identifier of the instance of the application,
    a role of a user, or
    an identifier of the user.

4. The computer-implemented method of claim 1, wherein the request comprises one or more of:
    a location of a user,
    an identifier of the data object,
    an identifier of the user,
    a role of the user,
    a priority indicator,
    an event,
    an identifier of an event log,
    a platform level indicator, or
    a version number.

5. The computer-implemented method of claim 1, wherein the lock mode is selected from among multiple available lock modes, and wherein the multiple available lock modes include an optimistic lock mode and a pessimistic lock mode.

6. The computer-implemented method of claim 1, wherein the determined lock mode is an optimistic lock mode and has a scope limited to the data object and the requesting instance of the application, the sending of the response indicating the determined lock mode causing the instance of the application to wait, subsequent to receiving the response, for the data object to become available according to the optimistic lock mode.

7. The computer-implemented method of claim 1, wherein the data object is a first data object, and wherein the determined lock mode is an optimistic lock mode and has a scope limited to the requesting instance of the application, but extending to a second data object distinct from the first data object; and
    wherein the sending of the response indicating the determined lock mode causes the instance of the application to wait, subsequent to receiving the response, for the first data object to become available according to the optimistic lock mode.

8. The computer-implemented method of claim 1, wherein the instance of the application is a first instance of the application, and wherein the lock mode determination service is shared by a plurality of instances of the application that include the first instance of the application.

9. The computer-implemented method of claim 8, wherein the determined lock mode is a pessimistic lock mode and has a scope limited to the data object, but extending to the plurality of instances of the application, the sending of the response indicating the determined lock mode causing the first instance of the application to wait, subsequent to receiving the response, for the data object to become available according to the pessimistic lock mode.

10. The computer-implemented method of claim 1, wherein the application is a first application, and wherein the lock mode determination service is shared by an instance of a second application different than the first application.

11. A computer-implemented system for managing locks on data objects, the system comprising:
- a lock mode determination service operably connected to a network; and
- a data store configured to store criteria for a service checklist associated with an application and accessible to the lock mode determination service;
- wherein the lock mode determination service comprises computer-readable instructions which, when executed by a processor, cause the lock mode determination service to:
  - evaluate one or more criteria of the service checklist to determine a lock mode in response to a lock mode request from a requestor; and
  - send an indication of the determined lock mode to the requestor prior to:
    - determination of availability of a first data object in a repository of data objects in accordance with the determined lock mode.

12. The computer-implemented system of claim 11, further comprising:
- a lock service operably connected to the repository of data objects;
- wherein the lock service comprises computer-readable instructions which, when executed by a processor, cause the lock service to:
  - access the repository of data objects in response to a data access request, from the requestor, that specifies the determined lock mode and the first data object; and
  - responsive to the availability of the first data object in accordance with the determined lock mode, retrieve the first data object and cause the first data object to be made available to the requestor.

13. The computer-implemented system of claim 12, wherein the lock mode determination service and the lock service are implemented with different servers.

14. The computer-implemented system of claim 12, wherein the requestor is a first instance of the application, the determined lock mode is an optimistic lock mode, and the first data object is available despite already being accessed by a second instance of the application distinct from the first instance of the application.

15. The computer-implemented system of claim 14, wherein, in response to a modification of the first data object by either one of the first and second instances of the application, the first data object ceases to be available to the other one of the first and second instances of the application.

16. The computer-implemented system of claim 11, wherein the service checklist is a first service checklist and the application is a first application, and wherein the data store is further configured to store criteria for a second service checklist distinct from the first service checklist and associated with a second application distinct from the first application.

17. A computer-implemented method for accessing data objects, the method comprising:
- by a data client:
  - receiving a user request requiring access to a data object;
  - issuing a lock mode request to a lock mode determination service to determine a lock mode;
  - receiving an indication of the determined lock mode, prior to determination of availability of the data object in accordance with the determined lock mode;
  - issuing a data access request, bypassing the lock mode determination service, to a lock service to access the data object in accordance with the determined lock mode; and
  - accessing the data object, responsive to availability of the data object in accordance with the determined lock mode.

18. The computer-implemented method of claim 17, further comprising:
losing access to the data object in response to a modification of the data object.

19. The computer-implemented method of claim 17, further comprising: losing access to the data object in response to a new determination, by the lock mode determination service, of a second lock mode for the data object that is different from the determined lock mode.

* * * * *